(12) United States Patent
Korsunsky et al.

(10) Patent No.: US 8,154,222 B2
(45) Date of Patent: Apr. 10, 2012

(54) PULSE-WIDTH MODULATION CURRENT CONTROL WITH REDUCED TRANSIENT TIME

(75) Inventors: Roman Korsunsky, Downington, PA (US); Mark S. Pieper, Stow, MA (US)

(73) Assignee: Texas Instruments Incorporated, Dallas, TX (US)

( * ) Notice: Subject to any disclaimer, the term of this patent is extended or adjusted under 35 U.S.C. 154(b) by 530 days.

(21) Appl. No.: 12/178,302

(22) Filed: Jul. 23, 2008

(65) Prior Publication Data

US 2010/0019697 A1 Jan. 28, 2010

Related U.S. Application Data

(63) Continuation-in-part of application No. 12/056,059, filed on Mar. 26, 2008, now abandoned.

(60) Provisional application No. 60/908,211, filed on Mar. 27, 2007.

(51) Int. Cl.
*H05B 37/02* (2006.01)
*H05B 41/36* (2006.01)

(52) U.S. Cl. .................. 315/308; 315/307

(58) Field of Classification Search .............. 315/307, 315/308, 310, 300, 301, 302, 306
See application file for complete search history.

(56) References Cited

U.S. PATENT DOCUMENTS

| | | | |
|---|---|---|---|
| 5,422,562 A * | 6/1995 | Mammano et al. | 323/282 |
| 6,762,563 B2 | 7/2004 | St-Germain et al. | |
| 7,233,115 B2 * | 6/2007 | Lys | 315/291 |
| 7,304,464 B2 * | 12/2007 | Weng et al. | 323/285 |
| 7,358,706 B2 * | 4/2008 | Lys | 323/222 |
| 7,550,934 B1 * | 6/2009 | Deng et al. | 315/308 |
| 7,659,673 B2 * | 2/2010 | Lys | 315/247 |
| 7,764,054 B1 * | 7/2010 | Guo et al. | 323/224 |
| 2006/0038803 A1 | 2/2006 | Miller et al. | |

* cited by examiner

*Primary Examiner* — Douglas W Owens
*Assistant Examiner* — Minh D A
(74) *Attorney, Agent, or Firm* — William B. Kempler; Wade J. Brady, III; Frederick J. Telecky, Jr.

(57) ABSTRACT

One embodiment of the present invention includes a current regulator circuit. The circuit includes at least one switch configured to periodically couple and decouple a respective at least one voltage rail to an inductor to maintain a current through the inductor. The circuit also includes a pulse-width modulation (PWM) controller configured to set a duty-cycle associated with a switching signal to control the at least one switch based on a feedback signal that is associated with a magnitude of the current. The circuit also includes a switch-controlled current path configured to shunt the current from a load in response to a control signal. The circuit further includes an error circuit configured to provide an error term to the PWM controller upon activating the control signal to adjust the duty-cycle substantially instantaneously in response to the control signal.

20 Claims, 4 Drawing Sheets

PULSE-WIDTH MODULATION CURRENT CONTROL WITH REDUCED TRANSIENT TIME

RELATED APPLICATIONS

This application is a Continuation-In-Part of U.S. patent application Ser. No. 12/056,059, filed Mar. 26, 2008 now abandoned, which claims priority to U.S. Patent Application Ser. No. 60/908,211, filed Mar. 27, 2007. The subject matter of the aforementioned applications is incorporated herein by reference in their entirety.

TECHNICAL FIELD

This invention relates to electronic circuits, and more specifically to pulse-width modulation (PWM) current control with reduced transient time.

BACKGROUND

There is an ever increasing demand for electronic devices to operate with increased efficiency and reduced power to accommodate continuous reduction in size and increased operating speed. As an example, power can be efficiently regulated for light-emitting diodes (LEDs) that provide illumination for computer monitors and other display devices. Some monitors and display devices can be illuminated based on LED strings arranged in a grid that provide back illumination for a respective monitor or display. Other monitors implement a series of higher intensity LEDs positioned at one or both sides of the monitor that each illuminate a light-pipe that extends across the screen, thus providing back illumination for the monitor. Such monitors that implement the high intensity LEDs and light-pipes can be more scalable and flexible in implementation than LED string grids. However, each of the higher intensity LEDs can require more current, thus necessitating current regulation through each of the LEDs. To control brightness of the high intensity LEDs in such a monitor, a digital dimming signal can be applied. As an example, the digital dimming signal can periodically halt the flow of current through the LED, such as based on a predetermined pulse-width modulation (PWM) that is proportional to the brightness of the LED.

SUMMARY

One embodiment of the present invention includes a current regulator circuit. The circuit includes at least one switch configured to periodically couple and decouple a respective at least one voltage rail to an inductor to maintain a current through the inductor. The circuit also includes a pulse-width modulation (PWM) controller configured to set a duty-cycle associated with a switching signal to control the at least one switch based on a feedback signal that is associated with a magnitude of the current. The circuit also includes a switch-controlled current path configured to shunt the current from a load in response to a control signal. The circuit further includes an error circuit configured to provide an error term to the PWM controller based on the control signal to adjust the duty-cycle substantially instantaneously in response to the control signal.

Another embodiment of the invention includes a method for regulating a current. The method includes repeatedly activating at least one switch based on a duty-cycle of a switching signal to couple and decouple a respective at least one voltage rail to an inductor to maintain a current through the inductor and providing the current through an LED. The method also includes generating an error signal based on a magnitude of a feedback signal associated with a magnitude of the current relative to a reference voltage and setting the duty-cycle in response to comparing the error signal with a ramp signal. The method also includes periodically activating a digital dimming signal to dim an intensity of the LED and diverting the current from the LED through a current-path shunt in response to activating the digital dimming signal. The method further includes adjusting a magnitude of the error signal to adjust the duty-cycle in response to the digital dimming signal.

Another embodiment of the invention includes a current regulator circuit. The circuit includes means for periodically coupling and decoupling a respective at least one voltage rail to an inductor to generate a current through an LED. The circuit also includes means for setting a duty-cycle associated with a switching signal to control the means for periodically coupling and decoupling based on a feedback signal that is associated with a magnitude of the current and means for diverting the current from the LED in response to activating a digital dimming signal. The circuit further includes means for overriding the feedback signal to adjust the duty-cycle associated with the switching signal in response to the digital dimming signal.

DETAILED DESCRIPTION

The present invention relates to electronic circuits, and more specifically to pulse-width modulation (PWM) current control with reduced transient time. A current regulator circuit can regulate current flow through a light-emitting diode (LED) based on PWM current control. One or more switches repeatedly couples and decouples an inductor to and from a respective one or more voltage rails to maintain current flow through the inductor based on a duty-cycle of a switching signal. The inductor current thus flows through the LED to illuminate the LED. The duty-cycle can be set based on a feedback signal, such as based on monitoring a voltage across a resistor through which the inductor current flows. Specifically, the feedback signal can be provided to an error amplifier, such that the feedback signal can be compared with a predetermined reference voltage. The error amplifier can generate an error signal that can be compared with a ramp signal to set the duty-cycle of switching of the one or more switches.

A digital dimming signal, such as having a separate PWM duty-cycle, can be applied to the current regulator circuit to control a brightness of the LED. As an example, the inductor current can be diverted from the LED upon the digital dimming signal being asserted, such as through a current-path shunt. The current-path shunt can have a lower resistance magnitude than the LED, thus changing an output voltage of the inductor. In response, an error circuit can provide an error term to the associated PWM controller to adjust the magnitude of the error signal in response to the digital dimming signal, such as by drawing a current from the input of the comparator. As a result, the duty-cycle of the current regulator can change substantially instantaneously in response to the digital dimming signal. Accordingly, the feedback signal can maintain a substantially constant magnitude in response to the added error to provide rapid transient settling times associated with the inductor.

Figure 1:
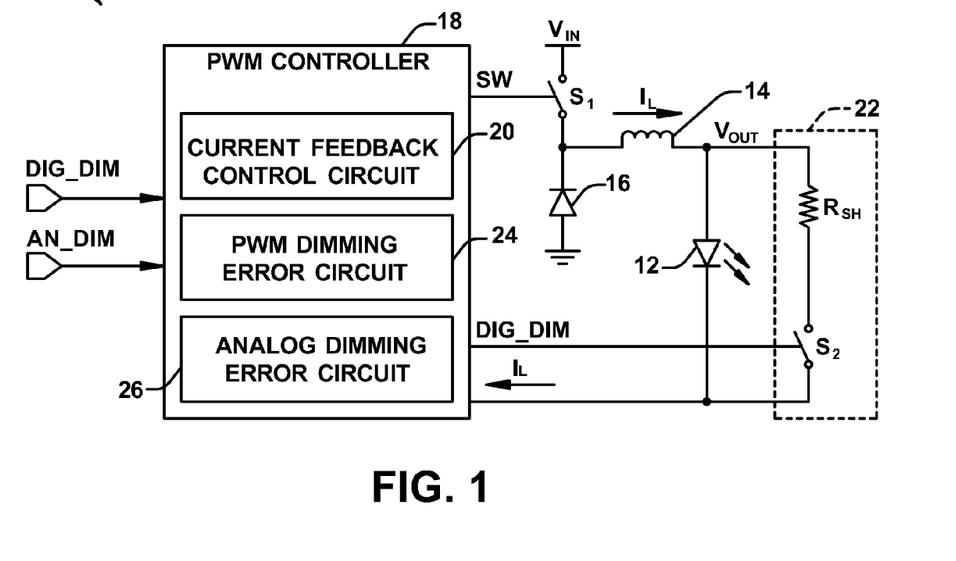
FIG. 1 illustrates an example of a current regulator system in accordance with an aspect of the invention.

FIG. 1 illustrates an example of a current regulator system 10 in accordance with an aspect of the invention. The current regulator system 10 can be implemented in any of a variety of electronic applications to regulate a current flow. In the example of FIG. 1, the current regulator system 10 is configured to regulate a current flow through a light-emitting diode (LED) 12. As an example, the LED 12 can be one of a plurality of LEDs that provide illumination through a light-pipe to backlight a monitor or display device. However, it is to be understood that the current regulator system 10 is not intended to be limited to regulating current through an LED, such as the LED 12.

The current regulator system 10 includes a switch $S_1$ that is driven by a switching signal SW. The switch $S_1$ is configured to periodically couple and decouple a positive rail voltage $V_{IN}$ to an inductor 14 based on a pulse-width modulation (PWM) duty-cycle. The current regulator system 10 also includes a freewheeling diode 16 configured to conduct current from a negative rail voltage, demonstrated as ground in the example of FIG. 1, when the switch $S_1$ decouples the inductor 14 from the positive rail voltage $V_{IN}$. Accordingly, the switch $S_1$ and the freewheeling diode 16 are configured to maintain a current $I_L$ through the inductor 14. The current $I_L$ flows through the LED 12 to illuminate the LED 12. Therefore, the current regulator system 10 is configured to regulate and thus maintain a substantially constant magnitude of the current $I_L$ through the LED 12. In response to the current $I_L$ flowing through the LED 12, an output voltage $V_{OUT}$ is generated at an anode of the LED 12.

The current regulator system 10 also includes a PWM controller 18. The PWM controller 18 is configured to set the duty-cycle of the switching signal SW in operating the switch $S_1$. Specifically, the PWM controller 18 includes a current feedback control circuit 20 that is configured to monitor the magnitude of the current $I_L$ in a feedback manner. As an example, the current feedback control circuit 20 can include an amplifier that amplifies a voltage across a sense resistor through which the current $I_L$ flows. The amplified voltage can be voltage provided as a feedback signal via a loop-compensation circuit to an error amplifier, such that the error amplifier can compare the feedback signal with a predetermined reference voltage. As a result, the error amplifier can generate an error signal that can be compared with a ramp signal, such as can be generated within the PWM controller 18, to set the duty-cycle of the switching signal SW.

The current regulator system 10 also includes a current-path shunt 22 that is arranged in parallel with the LED 12. The current-path shunt 22 includes a shunt resistor $R_{SH}$ and a switch $S_2$ arranged in series. The switch $S_2$ is controlled by a digital dimming signal DIG_DIM, which can be configured as a pulse-width modulated signal. The digital dimming signal DIG_DIM can be provided from an external source, as demonstrated in the example of FIG. 1, or can be generated from the PWM controller 18. Thus, as an example, the digital dimming signal DIG_DIM can be periodically activated and deactivated to respectively close and open the switch $S_2$. As a result, upon the switch $S_2$ being closed, the current $I_L$ is diverted from the LED 12 through the shunt resistor $R_{SH}$. It is to be understood that the shunt resistor $R_{SH}$ can have a significantly lower resistance magnitude than the LED 12, such that substantially all of the current $I_L$ flows through the shunt resistor $R_{SH}$ upon the switch $S_2$ being closed. Accordingly, the LED 12 is no longer illuminated at the times that the digital dimming signal DIG_DIM is activated, which can cause the LED 12 to appear dimmer to the human eye, depending on the duty-cycle of the digital dimming signal DIG_DIM.

In response to the current $I_L$ being diverted from the LED 12 through the shunt resistor $R_{SH}$, the output voltage $V_{OUT}$ decreases based on the resistance magnitude of the shunt resistor $R_{SH}$ relative to the LED 12. However, the transient response of a closed-loop system that includes the inductor 14 and associated feedback control circuitry in the PWM controller 18 can be slow. As a result, upon the switch $S_1$ being closed, the inductor 14 tends to increase the current $I_L$ to compensate for the change in the output voltage $V_{OUT}$. In response, the current feedback control circuit 20 can begin to reduce the duty-cycle of the switching signal SW, such as to attempt to maintain a substantially constant magnitude of the current $I_L$. However, because of the slow transient response of the inductor 14, and because of the low bandwidth of the feedback loop that controls the duty-cycle in the current feedback control circuit 20, the overall transient response of the closed-loop system of the current regulator system 10 can be slow, such that the current $I_L$ can experience a transient settling at every transition of the digital dimming signal DIG_DIM.

To overcome the slow transient response of the current regulator system 10, the PWM controller 18 includes a digital dimming error circuit 24. The digital dimming error circuit 24 can be configured to add an error term to the current feedback control circuit 20 in a feedforward manner. As an example, the error term can be proportional to the resistance magnitude of the shunt resistor $R_{SH}$. For example, the digital dimming error circuit 24 can provide the error term to the error signal that is compared with the ramp signal. Thus, the error term can affect the comparison, resulting in a substantially instantaneous change in the duty-cycle of the switching signal SW. Accordingly, by reducing the duty-cycle of the switching signal SW, and thus the closing of the switch $S_1$, the inductor 14 can maintain a substantially constant magnitude of the current $I_L$ while the current $I_L$ is being diverted through the current-path shunt 22. Accordingly, the current $I_L$ can experience a very fast transient settling time (e.g., 1 microsecond) in response to a full load current step through the LED 12.

In addition to dimming the LED 12 via the digital dimming signal DIG_DIM, the intensity of the LED 12 can also be controlled via analog dimming. Specifically, the PWM controller 18 includes an analog dimming error circuit 26 that is configured to provide an additional error term to the current feedback control circuit 20 in response to an analog dimming signal AN_DIM. As an example, the additional error term can be implemented by the current feedback control circuit 20 to change the duty-cycle of the switching signal SW while the current $I_L$ is being provided through the LED 12. However, the additional error term can also be provided to the digital dimming error circuit 24. As a result, while the current $I_L$ is being diverted through the shunt resistor $R_{SH}$, the digital dimming error circuit 24 can offset the effect of the additional error term on the duty-cycle. As such, the adjusted duty-cycle resulting from the activation of the digital dimming signal DIG_DIM can be substantially maintained while the current $I_L$ is being diverted through the shunt resistor $R_{SH}$, even when the analog dimming error circuit 26 applies analog dimming to the PWM controller 18.

It is to be understood that the current regulator system 10 is not intended to be limited to the example of FIG. 1. As an example, as described above, the current regulator system 10 is not limited to regulating current through the LED 12, but could regulate current through any of a variety of loads. In addition, the current regulator system 10 is not limited to implementing the switch $S_1$ and the freewheeling diode 16 to maintain the current $I_L$ through the inductor 14, but could instead implement high and low-side switching or any of a variety of other switching arrangements. As an example, the free-wheeling diode 16 can be replaced by a low-side metal-oxide semiconductor field-effect transistor (MOSFET) switch that is configured to conduct current from ground from a complement of the switching signal SW. Furthermore, although the current regulator system 10 is demonstrated in the example of FIG. 1 as a buck-converter, it is to be understood that the current regulator system 10 can be configured as a different type of power converter. Accordingly, the current regulator system 10 can be configured in any of a variety of ways.

Figure 2:
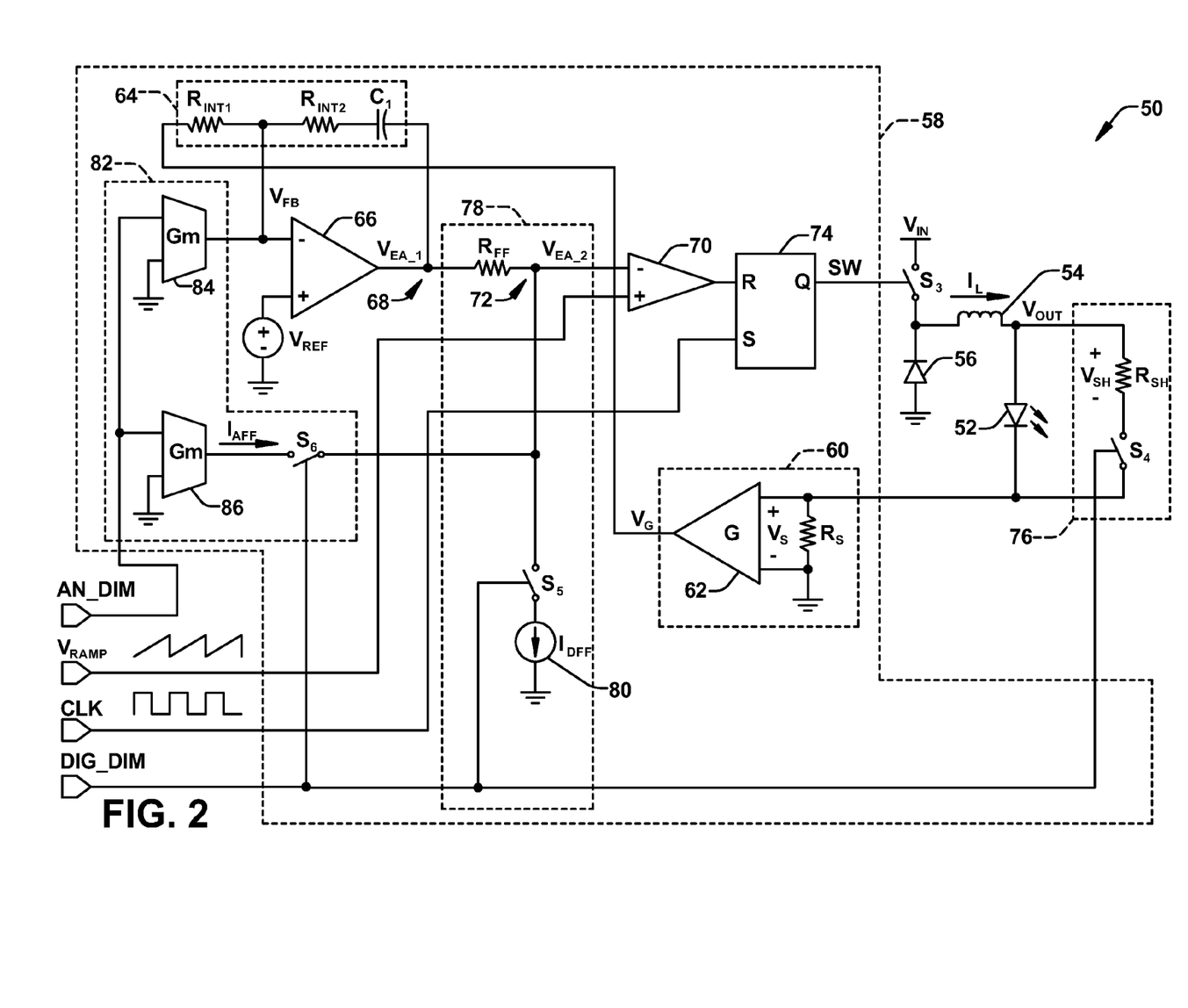
FIG. 2 illustrates an example of a current regulator circuit in accordance with an aspect of the invention.

FIG. 2 illustrates an example of a current regulator circuit 50 in accordance with an aspect of the invention. The current regulator circuit 50 can be configured substantially similar to the current regulator system 10 in the example of FIG. 1. As an example, the current regulator circuit 50 can be implemented in any of a variety of electronic applications to regulate current through an LED 52. For example, the LED 52 can be one of a plurality of LEDs that provide illumination through a light-pipe to backlight a monitor or display device.

The current regulator circuit 50 includes a switch $S_3$ that is driven by a switching signal SW. The switch $S_3$ is configured to periodically couple and decouple a positive rail voltage $V_{IN}$ to an inductor 54 based on a PWM duty-cycle. The current regulator circuit 50 also includes a freewheeling diode 56 configured to conduct current from a negative rail voltage, demonstrated as ground in the example of FIG. 2, when the switch $S_3$ decouples the inductor 54 from the positive rail voltage $V_{IN}$. Accordingly, the switch $S_3$ and the freewheeling diode 56 are configured to maintain a current $I_L$ through the inductor 54. The current $I_L$ flows through the LED 52 to illuminate the LED 52. Therefore, the current regulator circuit 50 is configured to regulate and thus maintain a substantially constant magnitude of the current $I_L$ through the LED 52. In response to the current $I_L$ flowing through the LED 52, an output voltage $V_{OUT}$ is generated at an anode of the LED 52.

The current regulator circuit 50 also includes a PWM controller 58. The PWM controller 58 is configured to set the duty-cycle of the switching signal SW in operating the switch $S_3$. Specifically, the PWM controller 58 includes a current monitor circuit 60 that is configured to monitor the magnitude of the current $I_L$. The current monitor circuit 60 includes a sense resistor $R_S$ through which the current $I_L$ flows to ground. As an example, the sense resistor $R_S$ can be configured as an external component. A fixed gain voltage amplifier 62 is configured to amplify a sense voltage $V_S$ across the sense resistor $R_S$ by a gain G. The resultant amplified voltage $V_G$ is fed back to a loop-compensation voltage integrator 64. The loop-compensation voltage integrator 64 includes a first integration resistor $R_{INT1}$, a second integration resistor $R_{INT2}$, and a capacitor $C_1$. As an example, the first integration resistor $R_{INT1}$, the second integration resistor $R_{INT2}$, and the capacitor $C_1$ of the loop-compensation voltage integrator 64 can be configured as external components.

The PWM controller 58 also includes an error amplifier 66. The amplified voltage $V_G$ is provided to the first integration resistor $R_{INT1}$, and the capacitor $C_1$ couples the loop-compensation voltage integrator 64 to an output of the error amplifier 66. As such, the loop-compensation voltage integrator 64 provides a feedback voltage $V_{FB}$ from between the first and second integration resistors $R_{INT1}$ and $R_{INT2}$ to an inverting terminal of the error amplifier 66. The error amplifier 66 is thus configured to compare the feedback voltage $V_{FB}$ with a predetermined reference voltage $V_{REF}$ that is provided to a non-inverting terminal of the error amplifier 66. Accordingly, the error amplifier 66 generates a first error voltage $V_{EA\_1}$ at a node 68 as a result of the comparison, the first error voltage $V_{EA\_1}$ being based on a difference between the magnitudes of the feedback voltage $V_{FB}$ and the reference voltage $V_{REF}$.

The PWM controller 58 also includes a comparator 70. The comparator 70 receives a second error voltage $V_{EA\_2}$ at an inverting input that is coupled to a node 72, the second error voltage $V_{EA\_2}$ being based on the first error voltage $V_{EA\_1}$, and a ramp signal $V_{RAMP}$ at a non-inverting input. As an example, the ramp signal $V_{RAMP}$ can be generated within the PWM controller 58, or can be provided from an external source. Therefore, the comparator 70 compares the magnitudes of the second error voltage $V_{EA\_2}$ and the ramp signal $V_{RAMP}$ to set the duty-cycle of the switching signal SW. The comparator 70 provides an output to an RS-latch 74 that latches the output of the comparator 70 based on a clock signal CLK, thus establishing the switching signal SW as a fixed-frequency PWM signal. The switching signal SW is thus provided at an output of the RS-latch 74. As a result, at a substantially steady-state of operation of the current regulator circuit 50, the feedback voltage $V_{FB}$ is approximately equal to the reference voltage $V_{REF}$, and the sense voltage $V_S$ has a magnitude that is approximately equal to $(V_{REF}/G)$, where G is a gain of the fixed gain voltage amplifier 62.

The current regulator circuit 50 also includes a current-path shunt 76 that is arranged in parallel with the LED 52. The current-path shunt 76 includes a shunt resistor $R_{SH}$ and a switch $S_4$ arranged in series. The switch $S_4$ is controlled by a digital dimming signal DIG_DIM which can be configured as a pulse-width modulated signal. Thus, similar to as described above in the example of FIG. 1, the digital dimming signal DIG_DIM can be periodically activated and deactivated to respectively close and open the switch $S_4$ to divert the current $I_L$ from the LED 52 through the shunt resistor $R_{SH}$. Accordingly, the LED 52 is no longer illuminated at the times that the digital dimming signal DIG_DIM is activated.

The PWM controller 58 also includes a digital dimming error circuit 78 to provide a substantially instantaneous adjustment to the duty-cycle of the switching signal SW, such as to overcome the slow transient response of the inductor 54 in response to diverting the current $I_L$ through the shunt resistor $R_{SH}$, similar to as described in the example of FIG. 1. The digital dimming error circuit 78 is configured to add an error term to the second error voltage $V_{EA\_2}$ in a feedforward manner. Specifically, the digital dimming error circuit 78 includes a resistor $R_{FF}$ that interconnects the node 68 and the node 72, a current supply 80 that conducts a current $I_{DFF}$ to ground, and a switch $S_5$ that couples the current supply 80 to the node 72 in response to the digital dimming signal DIG_DIM.

When the digital dimming signal DIG_DIM is deactivated, such that the current $I_L$ flows through the LED 52, the first error voltage $V_{EA\_1}$ and the second error voltage $V_{EA\_2}$ are substantially equal. As such, the comparator 70 compares the error signal that is based on the difference between the feedback voltage $V_{FB}$ and the reference voltage $V_{REF}$. However, upon activation of the digital dimming signal DIG_DIM, the switch $S_5$ closes, such that the current $I_{DFF}$ flows through the resistor $R_{FF}$ and from the node 72. In response, a voltage difference is generated between the first error voltage $V_{EA\_1}$ and the second error voltage $V_{EA\_2}$. As an example, the voltage difference (e.g., $I_{DFF}*R_{FF}$) can be proportional to a difference of the magnitude of the output voltage $V_{OUT}$ when the current $I_L$ is conducted through the LED 52 relative to when the current $I_L$ is conducted through the current-path shunt 76. As a result, the first error voltage $V_{EA\_1}$ remains substantially constant at logic-state transitions of the digital dimming signal DIG_DIM, but the second error voltage $V_{EA\_2}$ decreases by a magnitude that is proportional to the voltage $V_{SH}$. Therefore, the duty-cycle of the switching signal SW changes substantially instantaneously in response to the activation of the digital dimming signal DIG_DIM based on the change in magnitude of the second error voltage $V_{EA\_2}$ as perceived by the comparator 70. Accordingly, the current $I_L$ can remain substantially constant (e.g., 1 microsecond settling time), regardless of full load current steps through the LED 52 (e.g., between approximately 0 and 5-10 amps). Specifically, the settling time of the current $I_L$ is significantly shorter based on the digital dimming error circuit 78 injecting the error term to the second error voltage $V_{EA\_2}$ in a feedforward manner rather than relying on the feedback loop of the PWM controller 58 to settle the current $I_L$.

Figure 3:
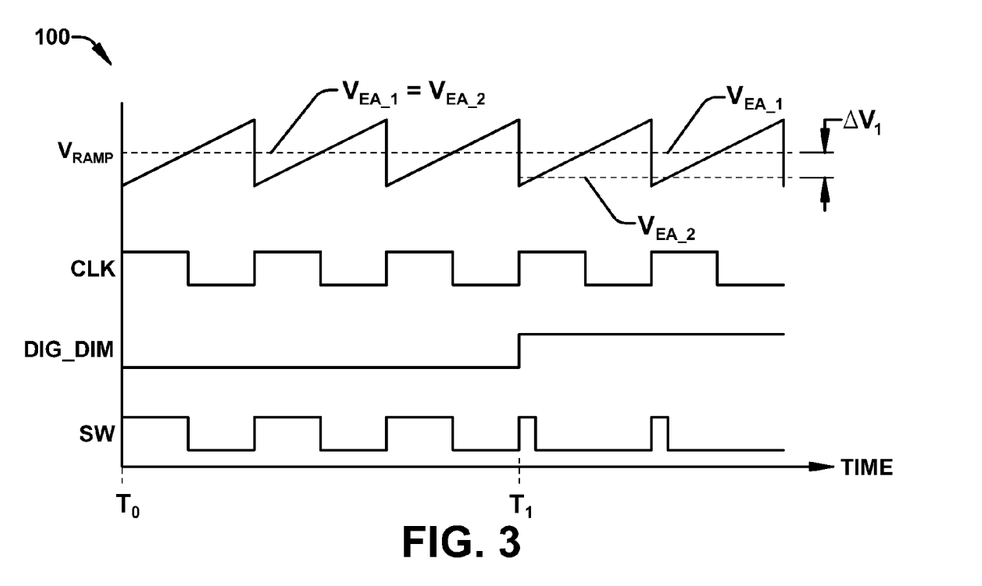
FIG. 3 illustrates an example of a timing diagram of a current regulator circuit in accordance with an aspect of the invention.

FIG. 3 illustrates an example of a timing diagram 100 of a current regulator circuit in accordance with an aspect of the invention. The timing diagram 100 can correspond to timing of the current regulator circuit 50 of the example of FIG. 2. As such, reference is to be made to the example of FIG. 2 in the following description of the example of FIG. 3. It is also to be understood that the timing diagram 100 is demonstrated as an ideal timing diagram, such that inherent latency and delays associated with the signals therein are not demonstrated in the example of FIG. 3.

The timing diagram 100 plots the ramp signal $V_{RAMP}$, the clock signal CLK, the digital dimming signal DIG_DIM, and the switching signal SW over time. The timing diagram 100 also demonstrates the magnitudes of the first error voltage $V_{EA\_1}$ and the second error voltage $V_{EA\_2}$ relative to the ramp signal $V_{RAMP}$. At a time $T_0$, the digital dimming signal DIG_DIM is de-asserted (i.e., logic low). Therefore, the first error voltage $V_{EA\_1}$ and the second error voltage $V_{EA\_2}$ are approximately equal. Thus, the RS-latch 74 latches the output of the comparator 70 at leading-edges of the clock signal CLK to generate the switching signal SW. The switching signal SW is thus demonstrated as having a duty-cycle of approximately 50%, although it is to be understood that the 50% duty-cycle is an example of the duty-cycle necessary to maintain a substantially constant value of the current $I_L$ through the inductor 54.

At a time $T_1$, the digital dimming signal DIG_DIM is asserted (i.e., logic high). Therefore, the switches $S_4$ and $S_5$ each close substantially concurrently, such that the current $I_L$ is diverted through the shunt resistor $R_{SH}$ and the current $I_{DFF}$ flows through the resistor $R_{FF}$ and from the node 72. As a result, the second error voltage $V_{EA\_2}$ decreases by a magnitude of $V_1$, such that the first error voltage $V_{EA\_1}$ and the second error voltage $V_{EA\_2}$ differ by a magnitude of $\Delta V_1$, where $V_1$ has a magnitude of approximately $I_{DFF}*R_{FF}$. The comparator 70 thus compares the magnitudes of ramp signal $V_{RAMP}$ and the second error voltage $V_{EA\_2}$. Thus, the clock signal CLK latches the output of the comparator as the switching signal SW having an adjusted duty-cycle that is substantially less than the previous duty-cycle. Accordingly, the duty-cycle of the switching signal SW changes substantially instantaneously when the current $I_L$ is diverted from the LED 52 through the shunt resistor $R_{SH}$.

Referring back to the example of FIG. 2, the current regulator circuit 50 also includes an analog dimming error circuit 82 configured to provide analog dimming capability with respect to the LED 52. The analog dimming error circuit 82 includes a first transconductance amplifier 84 that receives an analog dimming signal AN_DIM. The first transconductance amplifier 84 has an output that is coupled to the non-inverting input of the error amplifier 66, and thus contributes an analog error current to the feedback voltage $V_{FB}$. As a result, in response to the analog dimming signal AN_DIM, the error amplifier 66 reduces the magnitude of the first error voltage $V_{EA\_1}$, and thus the second error voltage $V_{EA\_2}$, which in turn reduces the duty-cycle of the switching signal SW to decrease the magnitude of the current $I_L$ through the LED 52.

The analog dimming error circuit 82 also includes a switch $S_6$ and a second transconductance amplifier 86 that likewise receives the analog dimming signal AN_DIM. The first and second transconductance amplifiers 84 and 86 need not be configured to provide equal current gains of the analog dimming signal AN_DIM. The second transconductance amplifier 86 generates a current $I_{AFF}$ that gets coupled to the node 72 in response to closure of the switch $S_6$ by the digital dimming signal DIG_DIM. Therefore, upon the digital dimming signal DIG_DIM being asserted, the current $I_{AFF}$ is provided to the node 72 to offset the adjustment to the second error voltage $V_{EA\_2}$ resulting from the adjustment to the feedback voltage $V_{FB}$ by the first transconductance amplifier 84. The offset could be such that the effect of the adjustment to the feedback voltage $V_{FB}$ by the first transconductance amplifier 84 is substantially cancelled, or could be such that the decrease of the second error voltage $V_{EA\_2}$ by the first transconductance amplifier 84 is mitigated. Accordingly, upon the digital dimming signal DIG_DIM being asserted to close the switch $S_4$ to divert the current $I_L$ through the shunt resistor $R_{SH}$, the current $I_L$ can remain substantially constant (e.g., rapidly settle) with respect to the magnitude of the current $I_L$ through the LED 52 in response to the analog dimming.

Figure 4:
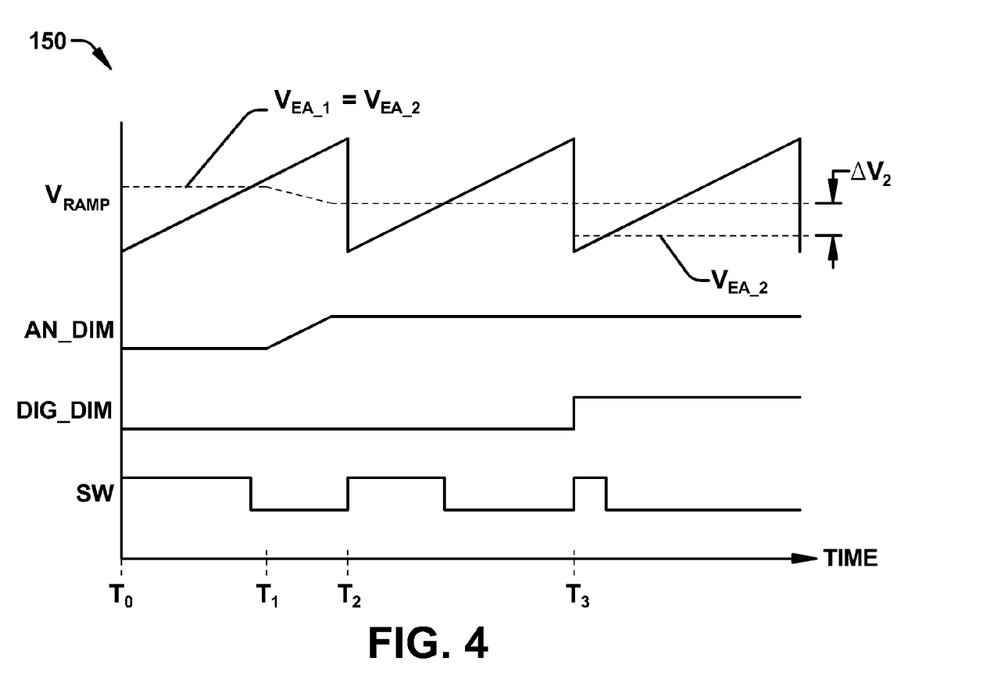
FIG. 4 illustrates another example of a timing diagram of a current regulator circuit in accordance with an aspect of the invention.

FIG. 4 illustrates another example of a timing diagram 150 of a current regulator circuit in accordance with an aspect of the invention. The timing diagram 150 can correspond to timing of the current regulator circuit 50 of the example of FIG. 2. As such, reference is to be made to the example of FIG. 2 in the following description of the example of FIG. 4. It is also to be understood that the timing diagram 150 is demonstrated as an ideal timing diagram, such that inherent latency and delays associated with the signals therein are not demonstrated in the example of FIG. 4.

The timing diagram 150 plots the ramp signal $V_{RAMP}$, the analog dimming signal AN_DIM, the digital dimming signal DIG_DIM, and the switching signal SW over time. The timing diagram 150 also demonstrates the magnitudes of the first error voltage $V_{EA\_1}$ and the second error voltage $V_{EA\_2}$ relative to the ramp signal $V_{RAMP}$. At a time $T_0$, the digital dimming signal DIG_DIM is de-asserted. Therefore, the first error voltage $V_{EA\_1}$ and the second error voltage $V_{EA\_2}$ are approximately equal. Thus, the RS-latch 74 latches the output of the comparator 70 at a leading-edge of the clock signal CLK (not shown) to generate the switching signal SW. As a result, the switching signal SW is provided at a first duty-cycle.

At a time $T_1$, the analog dimming signal AN_DIM begins to increase from a first magnitude (e.g., zero) to a second magnitude to introduce analog error to adjust the duty-cycle of the switching signal SW. Specifically, the magnitudes of the first and second error voltages $V_{EA\_1}$ and $V_{EA\_2}$ are demonstrated as decreasing based on the increase of the analog dimming signal AN_DIM and the corresponding increase of the feedback voltage $V_{FB}$ (not shown). Thus, at a time $T_2$, the RS-latch 74 latches the output of the comparator 70 at a leading-edge of the clock signal CLK to generate the switching signal SW having a second, shorter duty-cycle. As a result, the current $I_L$ (not shown) decreases in magnitude to dim the LED 52 in response to the shorter duty-cycle of the switching signal SW.

At a time $T_3$, the digital dimming signal DIG_DIM is asserted. Therefore, the switches $S_4$, $S_5$, and $S_6$ each close substantially concurrently. As such, the current $I_L$ is diverted through the shunt resistor $R_{SH}$, the current $I_{DFF}$ flows through the resistor $R_{FF}$ and from the node 72, and the current $I_{AFF}$ flows into node 72. As a result, the second error voltage $V_{EA\_2}$ decreases by a magnitude of $V_2$, such that the first error voltage $V_{EA\_1}$ and the second error voltage $V_{EA\_2}$ differ by a magnitude of $\Delta V_2$, where $V_2$ has a magnitude of approximately $R_{FF}*(I_{DFF}-I_{AFF})$. Thus, the magnitude of $\Delta V_2$ is less than the magnitude of $\Delta V_1$ in the example of FIG. 3, because the current $I_{AFF}$ offsets the adjustment to the first and second error voltages $V_{EA\_1}$ and $V_{EA\_2}$ beginning at the time $T_1$. The comparator 70 thus compares the magnitudes of ramp signal $V_{RAMP}$ and the second error voltage $V_{EA\_2}$. Therefore, the clock signal CLK latches the output of the comparator as the switching signal SW having a third duty-cycle that is substantially less than the first and second duty-cycles. Accordingly, the duty-cycle of the switching signal SW changes substantially instantaneously when the current $I_L$ is diverted from the LED 52 through the shunt resistor $R_{SH}$ to provide fast transient settling of the current $I_L$, regardless of the presence of analog dimming.

Referring back to the example of FIG. 2, it is to be understood that the current regulator circuit 50 is not intended to be limited to the example of FIG. 2. As an example, as described above, the current regulator circuit 50 is not limited to regulating current through the LED 52, but could regulate current through any of a variety of loads. In addition, the current regulator circuit 50 is not limited to implementing the switch $S_3$ and the freewheeling diode 56 to maintain the current $I_L$ through the inductor 54, but could instead implement high and low-side switching or any of a variety of other switching arrangements. As another example, although the current regulator circuit 50 is demonstrated in the example of FIG. 2 as a buck-converter, it is to be understood that the current regulator circuit 50 can be configured as a different type of power converter. Furthermore, the digital dimming error circuit 78 and the analog dimming error circuit 82 can each be configured in any of a variety of ways to add the respective error terms to the PWM controller 58 to adjust the duty-cycle of the switching signal SW substantially instantaneously. Accordingly, the current regulator circuit 50 can be configured in any of a variety of ways.

Figure 5:
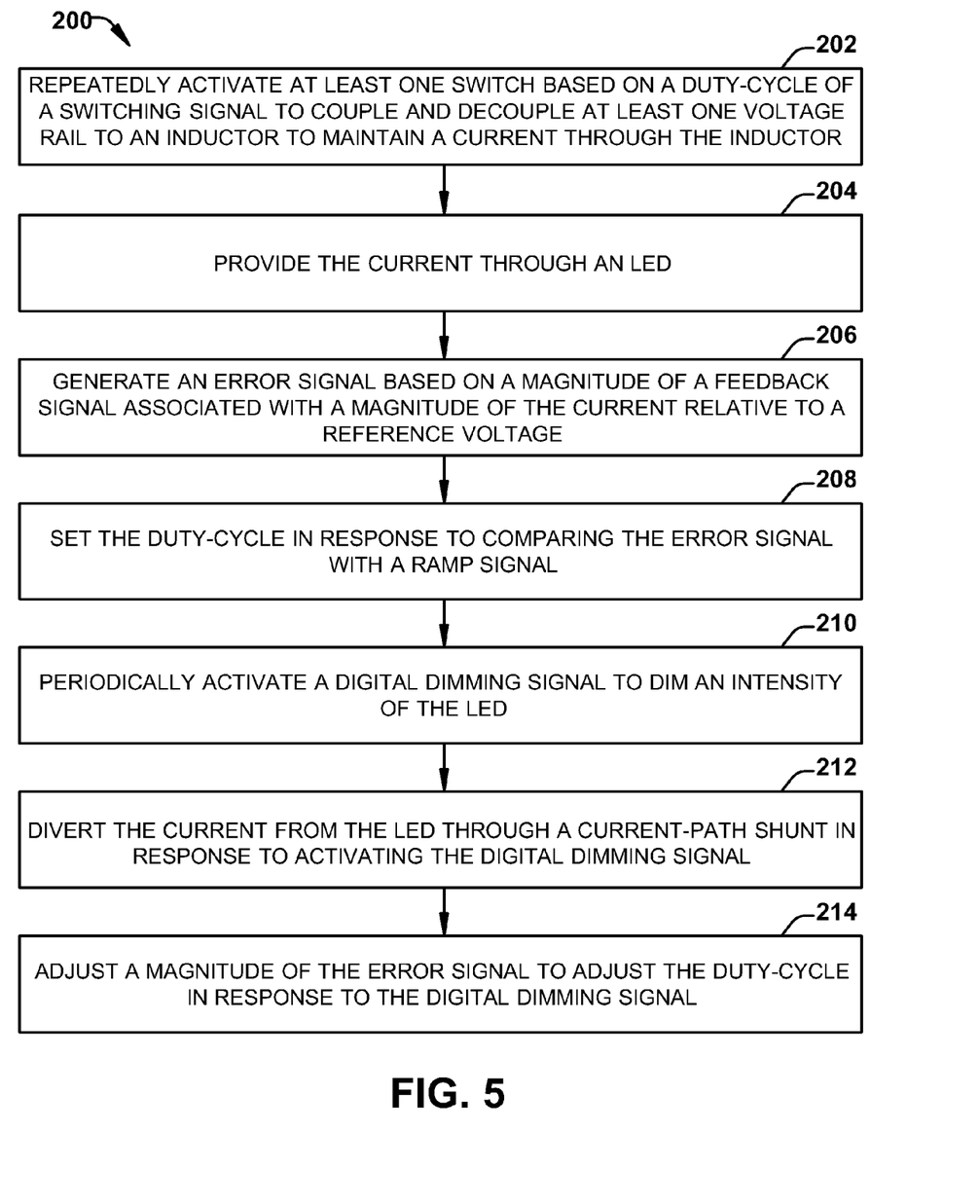
FIG. 5 illustrates an example of a method for regulating a current in accordance with an aspect of the invention.

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method.

FIG. 5 illustrates an example of a method 200 for regulating a current in accordance with an aspect of the invention. At 202, at least one switch is repeatedly activated based on a duty-cycle of a switching signal to couple and decouple a respective at least one voltage rail to an inductor to maintain a current through the inductor. The switch can be a high-side switch, such that a freewheeling diode conducts current from ground when the switch is deactivated. The duty-cycle can be set by a PWM controller. At 204, the current is provided through an LED. The current thus illuminates the LED based on a magnitude of the current.

At 206, an error signal is generated based on a magnitude of a feedback signal associated with a magnitude of the current relative to a reference voltage. The feedback signal can be generated based on monitoring a voltage across a sense resistor through which the current flows. The voltage can be amplified, loop-compensated, and provided as the feedback signal to an error amplifier that compares the feedback signal with the reference voltage. The comparison can thus yield the error signal. At 208, the duty-cycle is set in response to comparing the error signal with a ramp signal. The comparison can be based on a comparator, the output of which can be latched by a clock signal to generate the switching signal that defines the duty-cycle.

At 210, a digital dimming signal is periodically activated to dim an intensity of the LED. The digital dimming signal can be a PWM signal, such that the dimming occurs based on a time-division of the activation of the LED. At 212, the current is diverted from the LED through a current-path shunt in response to activating the digital dimming signal. The digital dimming signal can close a switch to provide a parallel path that includes a shunt resistor having much lower resistance than the LED. Thus, substantially all of the current can flow through the current-path shunt. At 214, a magnitude of the error signal is adjusted to adjust the duty-cycle in response to the digital dimming signal. An error term can be provided to the error signal that is compared with the ramp signal, as opposed to a second error signal that is output from the error amplifier, such that the feedback loop maintains a substantially consistent response when the current is diverted through the current-path shunt. Accordingly, the transient settling time of the current is very fast to result in a substantially constant current during a transition of the digital dimming signal.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims

What is claimed is:

1. A current regulator circuit comprising:
   at least one switch configured to periodically couple and decouple a respective at least one voltage rail to an inductor to maintain a current through the inductor;
   a pulse-width modulation (PWM) controller configured to set a duty-cycle associated with a switching signal to control the at least one switch based on a feedback signal that is associated with a magnitude of the current;
   a switch-controlled current path configured to shunt the current from a load in response to an external control signal; and
   an error circuit configured to provide an error signal to the PWM controller in response to the control signal to adjust the duty-cycle substantially instantaneously independent of the feedback signal associated with the magnitude of the current.

2. The circuit of claim 1, wherein the PWM controller comprises:
   an error amplifier configured to compare a voltage associated with the magnitude of the current with a predetermined reference voltage;

a comparator configured to compare a voltage associated with the output of the error amplifier at a comparator input with a ramp signal to set the duty-cycle; and a resistor interconnecting the output of the error amplifier and the comparator input.

3. The circuit of claim 2, wherein the error circuit comprises a current source configured to draw current associated with the error signal from the comparator input in response to the control signal.

4. The circuit of claim 2, wherein the error circuit is configured to subtract the error signal from the voltage associated with the output of the error amplifier to adjust the duty-cycle.

5. The circuit of claim 2, further comprising an analog error circuit configured to increase a magnitude of the feedback signal in response to an analog input signal and to increase a magnitude of the voltage associated with the output of the error amplifier in response to the analog input signal and the control signal.

6. A current regulator circuit comprising:
at least one switch configured to periodically couple and decouple a respective at least one voltage rail to an inductor to maintain a current through the inductor;
a pulse-width modulation (PWM) controller configured to set a duty-cycle associated with a switching signal to control the at least one switch based on a feedback signal that is associated with a magnitude of the current;
a switch-controlled current path configured to shunt the current from a load in response to a control signal; and
an error circuit configured to provide an error signal to the PWM controller upon activating the control signal to adjust the duty-cycle substantially instantaneously in response to the control signal, wherein the load is a light-emitting diode (LED), and wherein the control signal is a digital dimming signal that is pulse-width modulated to control a brightness associated with the LED based on a duty-cycle of the digital dimming signal.

7. The circuit of claim 6, further comprising an analog error circuit configured to provide an analog error signal to the PWM controller to further adjust the duty-cycle associated with the switching signal while the current is provided to the load.

8. The circuit of claim 7, wherein the analog error circuit comprises a first transconductance amplifier configured to adjust a magnitude of the feedback signal in response to an analog input signal.

9. The circuit of claim 8, wherein the analog error circuit further comprises a second transconductance amplifier configured to adjust the error signal in response to the analog input signal to maintain the adjusted duty-cycle upon activating the control signal.

10. The circuit of claim 2, wherein the error circuit is configured to adjust an error voltage by the error signal in a feedforward manner in response to the control signal, the error voltage being generated based on the feedback signal and being compared with a ramp signal to set the duty-cycle.

11. A method for regulating a current, the method comprising:
repeatedly activating at least one switch based on a duty-cycle of a switching signal to couple and decouple a respective at least one voltage rail to an inductor to maintain a current through the inductor;
providing the current through a light-emitting diode (LED);
generating an error signal based on a magnitude of a feedback signal associated with a magnitude of the current relative to a reference voltage;

setting the duty-cycle in response to comparing the error signal with a ramp signal;
periodically activating a digital dimming signal to dim an intensity of the LED;
diverting the current from the LED through a current-path shunt in response to activating the digital dimming signal; and
adjusting a magnitude of the error signal to adjust the duty-cycle in responds to the digital dimming signal.

12. The method of claim 11, further comprising:
setting a voltage across a sense resistor based on the current through the inductor;
amplifying the voltage across the sense resistor to generate an amplified voltage; and
generating the feedback signal from a loop-compensation voltage integration circuit based on the amplified voltage.

13. The method of claim 11, wherein adjusting the magnitude of the error signal comprises conducting an error current from the error signal in response to activating the digital dimming signal.

14. The method of claim 13, wherein generating the error signal comprises generating a first error signal from an error amplifier at a first node, wherein setting the duty-cycle comprises comparing a magnitude of a second error signal at a second node with the ramp signal, and wherein conducting the error current comprises activating a digital switch based on the digital dimming signal to conduct the error current through a resistor that interconnects the first node and the second node.

15. The method of claim 14, further comprising:
adding a first analog error current to the feedback voltage in response to an analog input signal;
decreasing the first error signal in response to the added first analog error current; and
adding a second analog error current to the second error signal in response to the analog input signal and the digital dimming signal.

16. The method of claim 11, further comprising:
generating a first analog error current in response to an analog input signal;
adding the first analog error current to the feedback signal to adjust the magnitude of the error signal upon deactivation of the digital dimming signal; and
adjusting the duty-cycle in response to the adjustment to the error signal upon deactivation of the digital dimming signal.

17. The method of claim 16, further comprising:
generating a second analog error current in response to the analog input signal;
adding the second analog error current to the error signal in response to activating the digital dimming signal to substantially offset the adjustment to the magnitude of the error signal resulting from the first analog error current in response to activation of the digital dimming signal.

18. A current regulator circuit comprising:
means for periodically coupling and decoupling a respective at least one voltage rail to an inductor to generate a current through a light-emitting diode (LED);
means for setting a duty-cycle associated with a switching signal to control the means for periodically coupling and decoupling based on a feedback signal that is associated with a magnitude of the current;
means for diverting the current from the LED in response to activation of a digital dimming signal; and means for overriding the feedback signal to adjust the duty-cycle associated with the switching signal in response to the digital dimming signal.

19. The circuit of claim 18, wherein the means for setting the duty-cycle comprises means for generating an error signal based on the feedback signal relative to the feedback signal, and wherein the means for overriding comprises means for adjusting a magnitude of the error signal in response to the digital dimming signal.

20. The circuit of claim 19, further comprising:
means for further adjusting the duty-cycle based on an analog input signal in response to deactivation of the digital dimming signal; and
means for substantially offsetting the adjustment of the duty-cycle based on the analog input signal in response to activation of digital dimming signal.

* * * * *